United States Patent [19]
Zaydowicz et al.

[11] 3,915,407
[45] Oct. 28, 1975

[54] TAPE OR FILM TRANSPORT

[75] Inventors: Gunnar Zaydowicz, Bierden; Gerhard Jung; Herbert Osmers, both of Bremen; Wolfgang Zwirner, Leeste; Eberhard Bartos, Bremen, all of Germany

[73] Assignee: Norddeutsche Mende Rundfunk KG, Bremen-Hemelingen, Germany

[22] Filed: Apr. 15, 1974

[21] Appl. No.: 460,909

[30] Foreign Application Priority Data

| | | |
|---|---|---|
| Apr. 17, 1973 | Germany | 2319303 |
| June 20, 1973 | Germany | 2331298 |
| Aug. 4, 1973 | Germany | 2339647 |
| Aug. 4, 1973 | Germany | 2339641 |

[52] U.S. Cl. .................. 242/188; 242/191; 242/195
[51] Int. Cl.$^2$ ........................ B65H 59/38; G03B 1/04; G11B 1/52; G11B 15/06
[58] Field of Search ............................ 242/186–191, 242/195; 360/71–74; 318/6, 7, 437

[56] References Cited

UNITED STATES PATENTS

| | | | |
|---|---|---|---|
| 2,760,137 | 8/1956 | Andrews | 318/437 |
| 3,806,061 | 4/1974 | Kollar et al. | 242/186 |
| 3,826,447 | 7/1974 | Yabu et al. | 242/188 |

*Primary Examiner*—Leonard D. Christian
*Attorney, Agent, or Firm*—Olson, Trexler, Wolters, Bushnell & Fosse, Ltd.

[57] ABSTRACT

A tape or film transport is provided with a delivery or supply spool or reel and a storage or take-up spool or reel. Automatic threading mechanism is provided. The tape or film is provided with perforations and a radiation source and radiation sensitive means coact therewith to provide output pulses related to the movement of the tape or film. The output pulses are connected to a logic circuit. In the absence of output pulses for a predetermined time the tape or film is automatically rewound on the delivery or supply spool.

19 Claims, 7 Drawing Figures

TAPE OR FILM TRANSPORT

Figure 1:
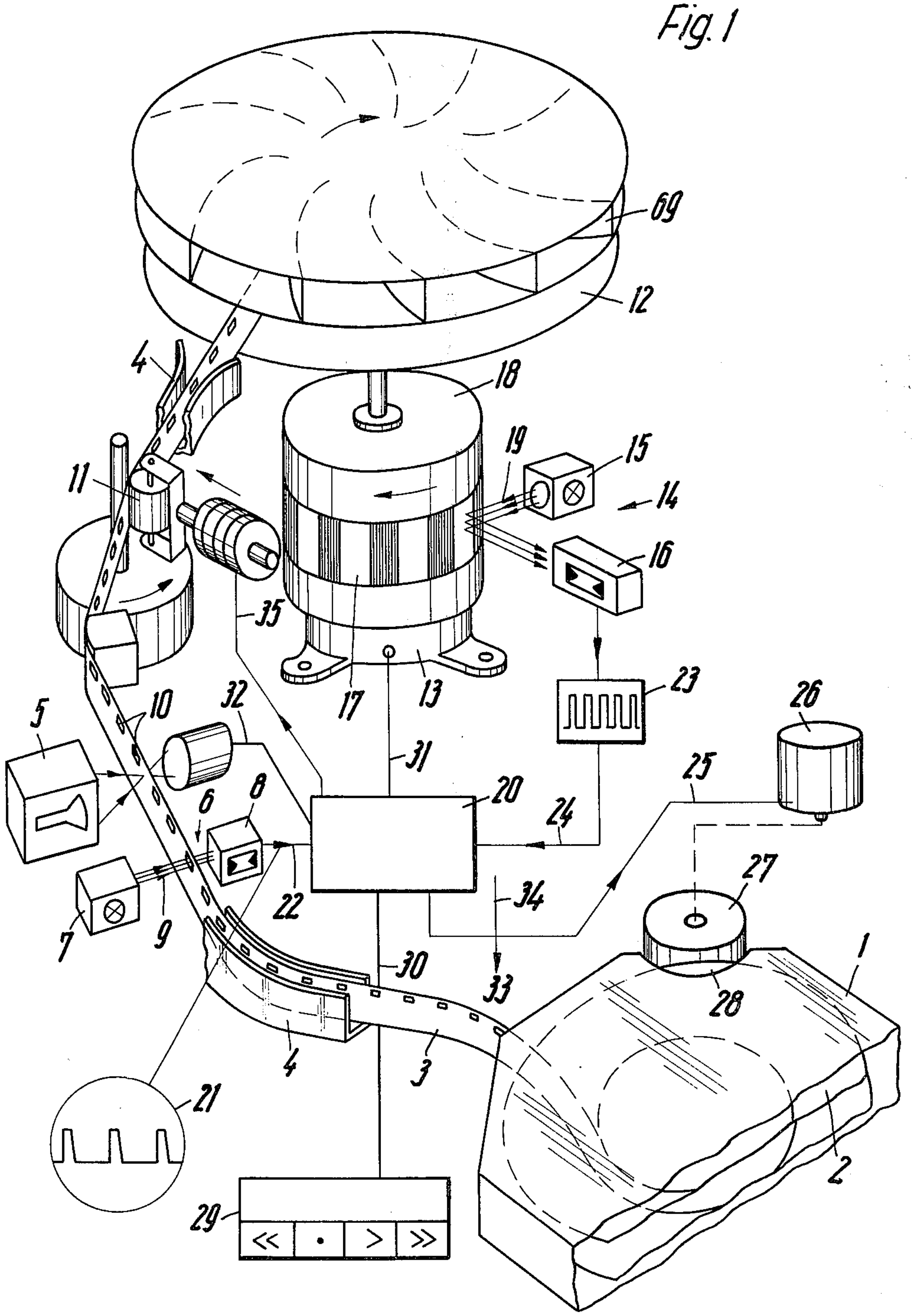

This invention relates to apparatus for the transport of a record support of tape-like form, which may be a magnetic tape or a film strip, and which may carry a record or be adapted to have a record placed thereon. Such record support will be referred to hereinafter as "record-carrying tape".

In recording and reproduction apparatus, there has long been the need of simplifying the handling of the tape and particularly of automating the threading and rewinding operations.

For example, a film projector has been proposed having the functions of automatic withdrawal of the leading end of the tape from the delivery spool and feeding it to the storage spool, of scanning the passing tape upstream of the storage spool, of automatically clamping the leading end of the tape to the motor-driven flanged storage spool, and of rewinding the tape from the storage spool onto the delivery spool. The various devices for performing those functions were operatively interconnected by an electric circuit and the scanning of the tape was performed by mechanically operated microswitches. However, the film projector contained nothing to safeguard the operation against failure of the tape to be fed correctly to the storage spool, for example because the leading end, having been withdrawn from the delivery spool failed to take the prescribed path through the apparatus and/or to be gripped by the storage spool. Faulty operation of this and other kinds cause the tape to be unwound continuously from the delivery spool into the appliance and to form a tangled coil therein; that results in damage to the tape and necessitates entry into the projector in order to remove the tangled tape.

While the risks above numerated can perhaps be accepted in the case of film projectors, where the operation and handling of the tape invariably occurs under the supervision of the projectionist, the corresponding risks cannot be accepted in the case of film scanning apparatus for reproduction on television receiving sets, because such appliances are usually inaccessible, merely having an opening for the insertion of the cassette containing the film delivery spool.

An object of the invention is therefore to reduce the dangers caused by malfunctioning of the automatic threading equipment.

In accordance with the present invention, apparatus for the transport of a record-carrying tape comprises means for feeding the tape between a delivery spool and a storage spool, means for rewinding the tape onto the storage spool, means for the automatic threading of the tape off the delivery spool to the storage spool, non-contact means for scanning the tape during movement to the storage spool and for generating an output dependent on the speed of the tape, and means controlled by the scanning means for initiating operation of the rewinding means in the absence of an output from the scanning means. With the invention, if incorrect threading occurs, no output signal is generated by the scanning means, so that the tape is automatically rewound onto the delivery spool, before damage can be done to it.

A preferred form of the invention resides in apparatus for the transport of a record-carrying tape between a delivery spool and a storage spool, comprising means for the automatic withdrawal of the leading end of the tape from the delivery spool and for feeding it to the storage spool, which is arranged automatically to receive and clamp the leading end, means for rewinding the tape onto the delivery spool, non-contact means for scanning the tape upstream of the storage spool and for generating a pulse output dependent on the tape speed, and means, controlled by the scanning means through a logic circuit, for initiating operation of the rewinding means in the absence of pulses from the scanning means.

The means for withdrawing the leading end of the tape from the delivery spool are preferably connected to the logic circuit in such a manner that the rewinding means are actuated, only if no pulses are received from the scanning means within a certain prescribed period after the withdrawal means have been initiated. If within that period, the tape has not arrived at the scanning means, it may be due to the fact that, although the withdrawal of the leading end from the delivery spool has been correctly effected, the tape has for some reason left the guide channel. Alternatively, the absence of pulses from the scanning means may be caused by the tape having been completely wound onto the storage spool, so that the drive of the storage spool ceases; in that case, the invention causes the tape to be automatically wound back onto the delivery spool.

It may also happen that the tape is correctly carried past the scanning means, with the result that the pulse output prevents the initiation of the rewind operation, but that the leading end of the tape has not been properly accepted by the storage spool. In those circumstances, the tape is forced past the storage spool and forms a tangled coil in the apparatus. In order to prevent that happening, according to a preferred form of the invention, the storage spool has a constant torque motor which is connected to a motor rotation speed scanner generating a pulse output dependent on the speed of rotation and connected with the logic circuit; the logic circuit compares the pulse outputs of the motor speed scanner and the tape scanner and is arranged to activate the rewinding means, if a prescribed relation of the pulse trains has not been obtained within a given time after the withdrawal means have been actuated. As the storage spool motor runs at a comparatively high, unloaded, speed before the leading end of the tape has been gripped by it, the pulses from the rotation speed scanner appear at a higher frequency than when the storage spool is braked by the clamping of the leading end of the film. If the higher repitition rate of the rotation speed scanner output is continued, it is indicative that the tape has not been accepted by the storage spool, and the comparison performed by the logic circuit effects rewinding of the tape.

With the aim of reducing the risk that the leading end of the tape will fail to be gripped by the storage spool, a suction device is preferably attached to the storage spool to generate between the flanges a current of air directed towards the axis of rotation. This suction apparatus preferably consists of blades of the rotary-pump type provided on the exterior of the spool, and suction intake apertures in the flange. The inwardly directed current of air between the flanges of the storage spool draws the leading end of the tape between the flanges by suction, where it is secured in position by clamping action.

Figure 2:
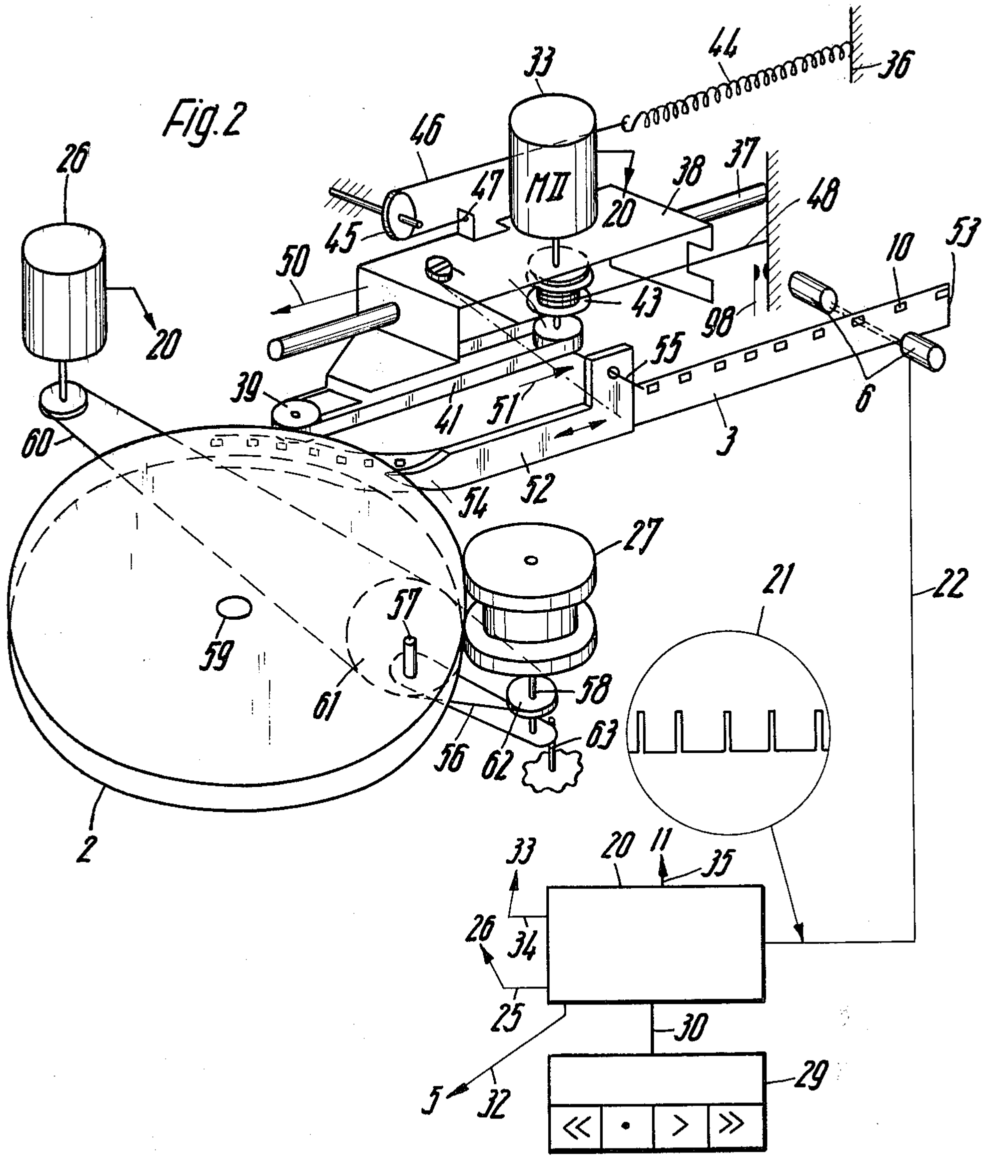
Figure 3:
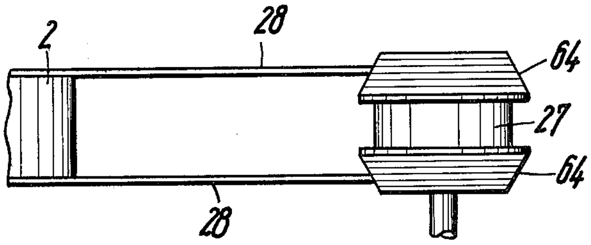
Figure 5:
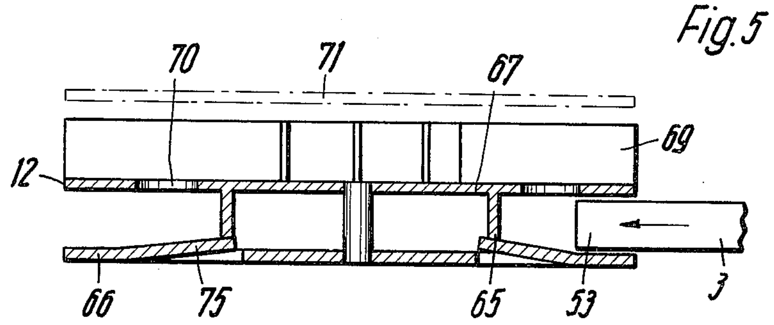
Figure 4:
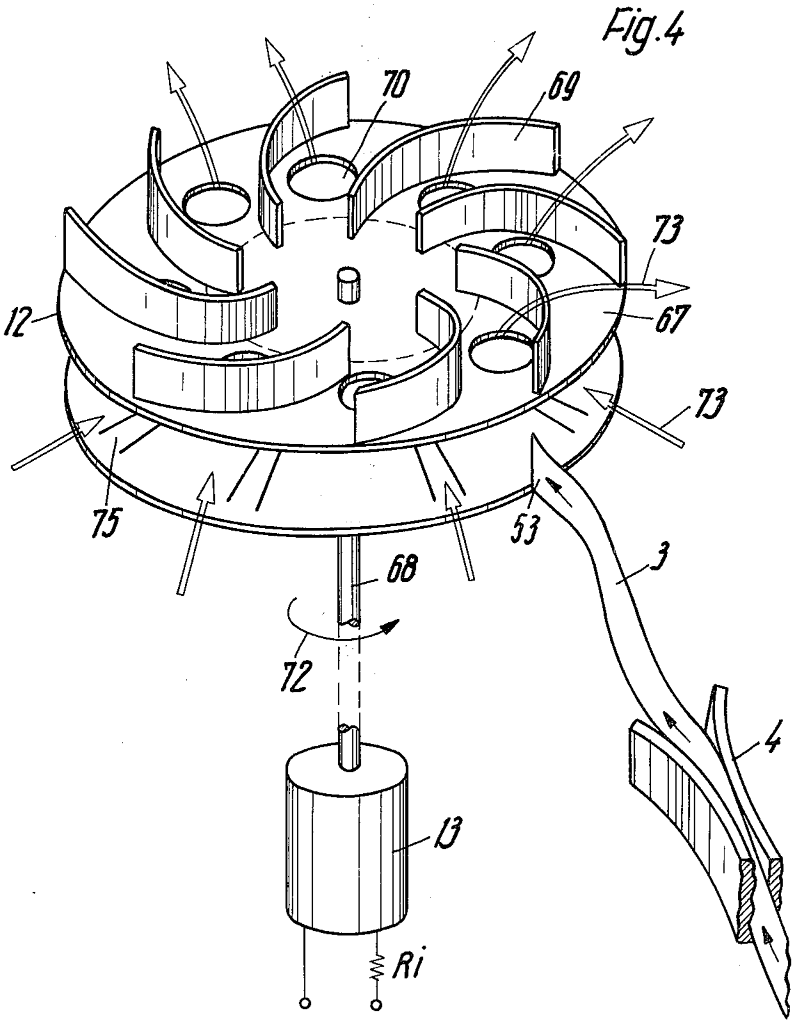
Figure 6:
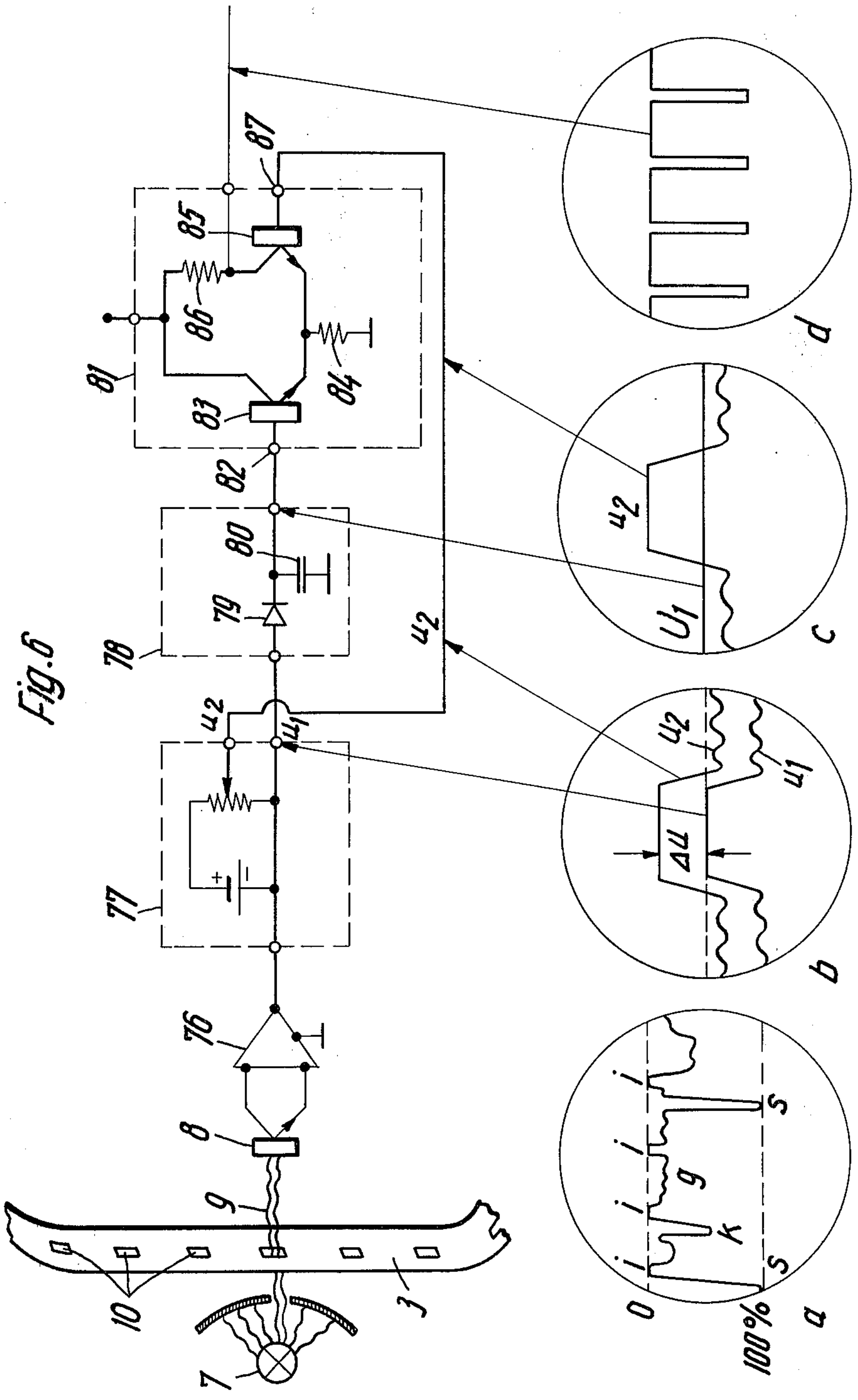
Figure 7:
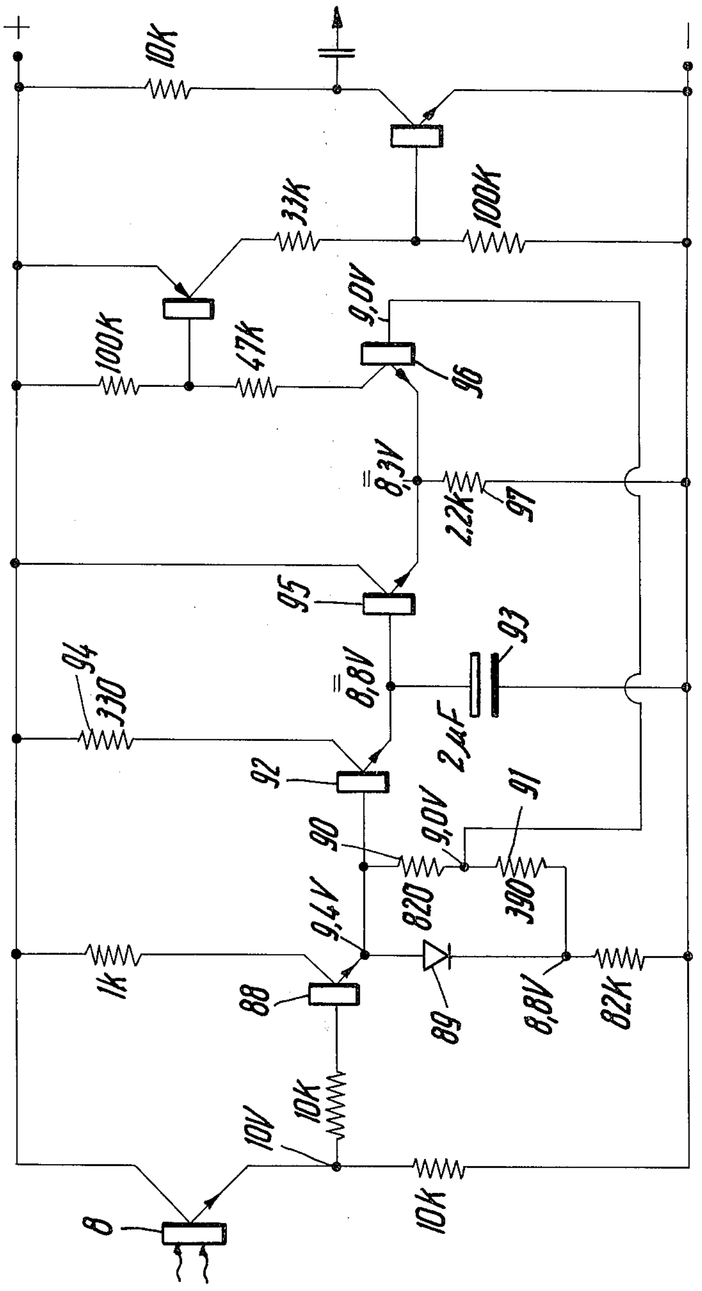

The invention will be more readily understood by the following description of tape transport apparatus in accordance therewith, reference being made to the accompanying drawings, in which FIG. 1 is a schematic and perspective diagram of the entire apparatus, apart from the means for withdrawing the leading end of the tape from the delivery spool, FIG. 2 schematically, and in perspective, illustrates the withdrawal means and the rewinding means, FIG. 3 is a view which shows one form of rewind friction roller, FIG. 4 is a view which shows in perspective the storage spool, with the cover removed, FIG. 5 is a central section through the storage spool together with the cover, FIG. 6 is a basic circuit diagram of the scanning means, and FIG. 7 is a detailed circuit diagram of the scanning means.

The apparatus shown schematically in FIG. 1 is accommodated in a housing which serves as an auxiliary appliance for a television receiver and which enables a film, such as an amateur-type narrow film of the Super 8 size, to be reproduced on the television screen. The housing, which is not shown, contains a mount for a film cassette 1 has and has a delivery spool 2 situated therein.

When the apparatus is switched on, the withdrawal means, to be described subsequently in relation to FIG. 2, withdraws the leading end of the film strip 3 from the delivery spool 2 and urges it into a guide track 4, of which FIG. 1 shows only a part. A scanning device 5 is disposed along the path of the tape 3 and is arranged to scan each successive individual picture on the tape and to produced a signal which is applied to the television receiver for reproduction of the pictures on the screen. Adjacent the outlet end of the guide track 4 are scanning means in the form of an impulse transmitter 6 and consisting of a light source 7 and a light responsive cell 8. The beam 9 from the light source 7 is directed towards the perforations 10 of the tape 3, the cell 8 receiving that light which passes through the perforations.

After leaving the guide track 4, the tape 3 enters a capstan drive 11 of known design, by which it is fed forward at a constant speed. The tape is next guided to the storage spool 12, which has a driving motor 13, and onto which the tape 3 is wound.

The motor 17 has a rotation speed scanner 14, which consists of a light source 15 and a light-responsive element 16; the light from source 15 is directed towards alternate black and white markings 17 on the outer rotor 18 of the motor 13, so that the light responsive element 16 receives pulses of light only when the light rays 19 from the source 15 strike a reflective white marking 17.

A logic circuit 20 receives via a line 22 the pulse output 21 from the perforation scanning means 6, and, via line 24, the pulse output 23 of the rotation speed scanner 14. In turn, the logic circuit 20 emits control signals on line 25 to driving motor 26 of rewind friction roller 27; as will be described in greater detail hereinafter, the friction roller 27 is caused, when required, to engage against flanges 28 of the delivery spool 2 and, when motor 26 is energised, drives that spool 2 in the rewind direction. Logic circuit 20 receives on line 30 control orders from control panel 29, which has the usual function keys, and it is connected via line 31 to control motor 13 of the storage spool 12, and, by line 32 to control the scanner 5. Motor 33 (FIG. 2) for the means for withdrawing the leading end of the tape from the delivery spool, is also connected via line 34 to the logic circuit 20. Finally, the logic circuit 20 controls, by line 35, the capstan drive 11.

FIG. 2 illustrates the withdrawal means for the leading end of the tape from the delivery spool 2, and the rewinding means. A guide rod 37 is secured to one wall 36 of the housing and extends approximately parallel to the first section of the guide track (not shown in FIG. 2). A slide 38 is mounted on the guide rod 37 for movement thereon and carries a deflecting pulley 39 and a drive pulley 40 for a belt 41, the sides of which extend approximately parallel to the guide rod 37. The drive pulley 40 is carried by shaft 42 of motor 33, the shaft also carrying a winding drum 43. A spring 44 is secured at one end to wall 36 and is arranged to urge the slide 38 towards the free end of the guide rod 37, i.e. towards the spool 2, through the medium of a traction cable 46 which passes over a pulley 45 mounted on the housing and attached at its free end to the slide 38 at 47. During such time as motor 43 is stationary, movement of the slide 38 under the action of spring 44 is prevented by a traction device in the form of a cable 48, which is secured at 49 to the wall 36 and is partly wound onto the winding drum 43. If the motor 33 is actuated, the traction cable 48 unwinds from drum 43 and the slide 38 is permitted to be drawn by spring 44 in the direction of the arrow 50.

When the slide 38 is drawn by the spring 44 as described, the belt drive consisting of pulleys 39 and 40 and the belt 41 enters between the flanges 28 of delivery spool 2, the belt at that time rotating in the direction of the arrow 51. As soon as belt 41, adjacent deflecting pulley 39, engages the outermost coil of tape on the spool 2, it begins to drive spool 2 via that coil; at the same time, a free-wheel mechanism in the winding drum 43 prevents the traction cable 48 from being unwound further from the winding drum 43; the winding drum 53 thus comes to a stop.

A stripper finger 52 is resiliently mounted on the slide 38 by a wire spring 55. As the belt 41 is brought into engagement with the tape, the stripper finger 52, the main part of which constitutes part of the guide track 4, moves into the delivery spool 2. The point front end 54 of stripper finger 52, bent in a direction opposite to the direction of the leading end 53 of the tape, lifts that end 53 off the coil, as soon as the belt 41 has moved that end into the appropriate position, and guides the end along the guide track 4; in FIG. 2, the leading end of the tape 3 is shown as having just passed the sensing means 6. When the leading end 53 reaches the capstan drive 11 (FIG. 1) and the tape feed operation has been taken over by the latter, motor 33 receives from logic circuit 20 a control order to rotate in the opposite direction, so that the traction cable 48 is wound onto the drum 43 and the slide 38 is moved rearwardly on guide rod 37, against the action of spring 42, to its rest position where a limit switch 98 switches off the motor 33 with the belt 41 and the stripper finger 54 out of engagement with the tape on spool 2.

The friction roller 27 for rewinding the tape 3 onto the delivery spool 2 is mounted on a lever 56 which can pivot about a pivot 57 located on the housing and disposed between driving shaft 58 of friction roller 27 and shaft 59 of the delivery spool 2. A belt 60 driven by motor 26 passes over an intermediate pulley 61 to a driving pulley 62 on shaft 58 of the friction roller 27; intermediate pulley 61 is mounted on pivot 57, so that rotation of the former is accompanied by rotation of lever 56 about pivot 57. In the inoperative state, the friction pulley 27 is in the position shown in FIG. 2, with the lever 56 in engagement with a stop 62 and the pulley 27 out of contact with the flanges 28 of delivery spool 2. When motor 26 is energised, the belt 60 causes, firstly, rotation of pulley 27 about its shaft 58 and, secondly, turning of the lever 56 in a clockwise direction to urge the pulley 27 into driving engagement with flanges 28. The spool 2 is thus driven in the rewind direction; after rewinding has been completed, motor 26 is caused to rotate in the opposite direction and with a low torque, to cause lever 56 to pivot back to stop 63, so that friction roller 27 is removed from delivery spool 2.

FIG. 3 shows the preferred form of friction roller 27: the friction roller has two frusto-conical driving rings 64, each to engage with one of the flanges 28.

FIGS. 4 and 5 illustrate the storage spool 12. That spool consists as usual of a winding core 65 and flanges 66 and 67, and is mounted on shaft 68 of driving motor 13. Motor 13 exerts a touque which is low, but which is almost independent of speed, so that upon excitation it accelerates the storage spool 12 to a comparatively high speed of rotation, if it is subject to no braking torque. The upper flange 67 carries blades 69 of the centrifugal pump type and, adjacent core 65, the flange 67 is interrupted between successive blades 69 by suction intake orifices 70. A cover plate 71, which has been omitted in FIG. 4, overlies the top of blades 69.

When motor 13 is energised to drive spool 12 in the direction indicated by arrows 72, blades 69 generate a current of air in the direction of arrows 73, 74 and directed between flanges 66, 67 towards the axis of shaft 68. As soon as the leading end 53 of tape 3 emerges from the end of quide track 4 adjacent storage spool 12, it is caught up by the current of air and conveyed between flanges 66, 67 until it is gripped between flange 67 and tongues 75, which are upset from flange 66. The leading end of the tape 3 is thus secured to the storage spool 12 and is wound up on it. The tape 3 now exerts a braking action on spool 12 so that the suction affect of blade 69 is considerably reduced, that suction being no longer required after the end 53 has been clamped in position.

The blades 69 may also form part of a carrying plate for a further tape spool, to be used possibly in place of the spool constituted by the flanges 66, 67. In that case, the additional spool is connected via perforations in the flange of that spool and in the base plate itself.

FIGS. 6 and 7 show one form of the pulse-generating scanner 6. As shown, the tape 3 consists of a film strip, having a track of perforations 10 arranged parallel to one of the edges of the strip. As the scanner is required to emit a pulse whenever a perforation 10 passes through the light beam 9, it must be ensured that those parts of the film strip between the perforations 10 produce no output pulse.

In the circuit of FIG. 6, the light beam 9 is received by the photo-sensitive cell 8, the output from which is applied to an amplifier 76 and is typically of the form shown in oscillogram *a*, where output voltage is shown as a function of time. In oscillogram *a*, the points *i* represent the output voltage resulting from the non-attenuated passage of light through the successive perforations 10, while the points *a* represent the voltage corresponding to parts of the tape 3 of maximum darkness, e.g. those parts of the film which bear printed text. Elsewhere, the light beam 9 is subject to different attenuations in its passage to cell 8; thus, in zone *k*, there are less dark parts of the film, while *g* represents parts where the attenuation is slight due perhaps to the presence of scratching of the film, and entailing an attenuation of only two to give percent. In a trace drawn to scale, hardly any difference would be perceptible between the sections *g* and points *i*.

To the output terminal of amplifier 76 is connected a direct voltage source 77 which, in addition to the amplified output signal $u1$, generates a second output signal $u2$ varying in accordance with$u$ 1 but increased relative to it by a direct voltage which can be selected. Thus, output signals $u2$ and $u1$ differ by a constant potential difference $\Delta u$, but otherwise is subjected to the same variations, as illustrated in oscillogram *b*. Output signal$u$ 1 is led to an integrating circuit 78, which rectifies the peak voltages and which consists of a diode 79 and a smoothing capacitor 80. The output of circuit 78 is a direct voltage U1, corresponding to the peak value of the output signal $u1$ if, for purposes of simplification, the voltage drop in diode 79 in the past direction is disregarded.

AS illustrated in oscillogram *c*, the potential difference $\Delta u$ is made such that in all cases only the head of the impulse peaks of signal $u$ 2, corresponding to the points *i* of oscillogram *a*, exceeds the constant voltage level $u$ 1. Other parts of the signal $u2$, and even those corresponding to sections *g* of oscillogram *a*, do not exceed U1. Differential amplifier 81, to which the signals U1, U2 are applied is so constructed that an output pulse only results if $u2$ exceeds U1; the result is that a train of output pulses of constant magnitude is produced, corresponding to the timings of the scanning of perforations 10. The output of integrating circuit 78 is connected to input 82 of differential amplifier 81, that input being connected with the base of a transistor 83 having, in its emitter circuit, a resistor 84. The voltage drop in resistor 84 is applied to the emitter of a further transistor 85 having in its collector circuit a resistor 86 of high value, in order to keep the current through transistor 85 so low that it causes no appreciable additional voltage drop in the resistor 84, however hard transistor 85 is driven. The voltage in the emitter of transistor 85 is thus largely determined by the constant voltage U1, via the emitter sequence 83, 84.

The second output signal $u2$ is applied to the second input 87 of the differential amplifier 81 and thence to the base of transistor 85. Transistor 85 conducts only when $u2$ is about 0.5V greater than the emitter voltage derived from $u2$, i.e. when the light beam 9 passes through a perforation 10 and is non-attenuated. In the parts of the tape 3 between successive perforations 10, $u$ 2 is always less than the emitter voltage derived from U1, plus the threshold voltage of about 0.5V, and thus no current flows in transistor 85, regardless of how far $u$ 2 falls. Thus, the transparency of the tape 3 between perforations 10 has no effect on the output voltage of the differential amplifier 81.

FIG. 7 shows a detailed circuit corresponding to FIG. 6, the cell 8 being shown as a photo-transistor. According to the form of the light source 7, the emitter of the photo-transistor has a peak voltage between 5 and 10 volts, when the photo-transistor is subject to light passed by a perforation 10; for the purposes of explanation, it will be assumed that the peak voltage is 10V. The signal from photo-transistor 8 is amplified by transistor 88; the emitter current of transistor 88 passes through a diode 89, in which an almost constant voltage drop occurs, so that that diode acts as the direct-voltage source 77 of FIG. 6, the polarity being interchanged. The superimposed voltage of diode 89, amounting to about 0.6V is divided by the voltage divider formed by resistors 90 and 91, leaving a potential difference $\Delta u$ of 9.4 − 9.0 = 0.4V. Transistor 92 acts with capacitor 93 as a peak voltage rectifier, the charging pulses being limited by a resistor 94. The capacitor 93 is subject to a constant direct voltage of 8.8V by virtue of the potential threshold between the base and emitter of transistor 92, and that voltage is applied to the first input of the differential amplifier formed by transistors 95 and 96, and resistor 97, the voltage being applied to the base of transistor 95.

The second output signal $u2$ tapped off voltage divider 90, 91 is led to the second input of the differential amplifier, i.e. to the base of transistor 96, signal $\mu$ 2 having a peak voltage of 9.0V and being therefore only 0.2V higher at the peak than the constant direct voltage of 8.8V at the first input of the differential amplifier. This very small excess compared with the over-all voltage is sufficient to generate the desired pulses at the output of the differential amplifier. If $u$ 2 falls below the constant direct voltage of 9.8V, transistor 96 is blocked and the output signal becomes zero. The degree of darkness of the tape 3 between perforations 10 is thus wholly without effect on the output. The differential amplifier is followed by a two-transistor amplifying circuit shown in FIG. 7 which amplifies the pulses in known manner.

The operation of the apparatus as a whole will now be briefly described:

To initiate the operation, a casssette of tape 1 is introduced into the housing and the function key "PLAY" of the control panel 29 is pressed. The logic circuit 20 then causes energisation of the rewind motor 26 for a period of about one second, and at the same time energises motor 33 so that belt 41 rotates and moves, with stripper finger 52, between the flanges of delivery spool 2. As the inner end of tape 3 is attached to the spool 2, the short burst of energisation of rewind motor 26 causes the coil of tape to be tightened. As a consequence, belt 41, when it reaches the spool 2 encounters a tightly wound coil having a clearly defined position which assists the withdrawal process of the leading end of the tape.

When belt 41 engages against the coil of tape, the movement of slide 38 ceases due to the slipping action of drum 43 as described. The rotation of the coil of strip resulting from the driving action of belt 41 moves the leading end 53 of the tape towards the stripper finger 52, the tip 54 of which has come to rest resiliently against the outermost layer of the coil. The leading end 53 is thus pushed forward into the guide 4, so that it is threaded through the scanner 5 and the scanning means 6. The output from the scanning means on line 22, due to the passage of perforations 10 past the light source 7, is applied to the logic circuit 20. In that logic circuit, a time circuit has been initiated, when the system was switched on by the control panel 29, i.e. at the same time as the motor 33 is energised. If the withdrawal of the leading end from the cassette 2 and the threading operations have been performed correctly the time delay has not come to an end when the first pulses arrive at the logic circuit 20 on line 22. If that should happen, the threading operation is continued. If, on the other hand, no pulses arrive on line 22 at logic circuit 20 within the time period, the logic circuit switches on the rewind motor 26, so that any tape 3 which has been fed from the spool 2 is rewound.

Capstan drive 11 and motor 13 of storage spool 12 are also energised by logic circuit 20, when the apparatus is first switched on. Shortly after passing the scanning means 6, the leading end 53 of the tape 3 reaches the capstan drive 11, which takes over the further feeding of the tape, motor 33 being energised in the opposite direction, as described above, to withdraw the belt 41 and the finger 52 from the spool 2. The capstan drive 11 feeds the leading end 53 of the tape to the spool 12 which, as it is subject to no load, rotates at a higher speed to generate the suction currents which draw the leading end by suction between the flanges 66, 67 of spool 12 and cause it to be clamped in that spool; as a consequence, spool 12 is intensely braked. The resulting reduction in the speed of the spool 12 alters the frequency of the ouput pulses 23 from the light sensitive element 16, those pulses being applied on line 24 to logic circuit 20. The logic circuit 20 compares the pulse output 23 with the pulse output 21 from the scanning means 6. If the two pulse outputs correspond approximately in repetition frequency, it is indicative that the tape 3 has been properly wound on to the storage spool 12 and feeding of the tape to that spool is continued. If, however, after a given time period, output 23 still has the high repetition frequency corresponding to the unbraked speed of spool 12, that fact is indicated by the comparison with the pulse train 21 from cell 8 and the logic circuit 20 again causes the rewind motor 26 to be energised and the contact pressure roller of the capstan drive 11 to be withdrawn from the tape, so that the tape is rewound on to the delivery spool 2.

When the film strip 3 has come to an end, the tape stops, because its trailing end is secured to delivery spool 2; the capstan drive 11 then over-runs. No pulses then appear from the scanning means 6, with the consequence that the logic circuit 20 causes the tape to be rewound on to spool 2, by energising motor 26 and by withdrawing the pressure roller of capstan drive 11 from the tape as before. If it is desired to rewind the tape, when part shown, the relevant function key on the control panel 29 is operated to simulate the absence of pulses from scanning means 6 to the logic circuit 20, and the logic circuit than automatically initiates the rewinding process in the same way.

Lastly, if the "rapid forward" key of control panel 29 is pressed, the contact pressure roller of capstan drive 11 is withdrawn from the tape by the logic circuit, via line 35. The storage spool 12, being unbraked by the capstan drive, then rotates at an increased speed to cause the tape 3 to be drawn rapidly through the feed path. Rewinding of the tape onto spool 2 is not initiated, because the pulse outputs from the element 16 and from the sensing means 6 are both increased in repetition frequency so that the comparison means within the logic circuit 20 does not indicate a disparity between the two pulse outputs.

We claim:

1. Apparatus for the transport of a record-carrying tape comprising means for feeding the tape between a delivery spool and a storage spool, means for rewinding the tape on to the storage spool, means for the automatic threading of the tape off the delivery spool to the storage spool, non-contact scanning means for scanning the tape during movement to the storage spool and for generating an output signal dependent on the speed of the tape, and means controlled by the scanning means for initiating operation of the rewinding means in the absence of said output signal from the scanning means.

2. Apparatus for the transport of a record-carrying tape between a delivery spool and a storage spool, comprising first drive means for the automatic withdrawal of the leading end of a tape from a delivery spool and for feeding it to a storage spool, clamping means on said storage spool automatically to receive and clamp the leading end of said tape, rewind means for rewinding the tape on to said delivery spool, non-contact scanning means for scanning the tape upstream of said storage spool and for generating a pulse signal output dependent on the tape speed, and logic circuit means, controlled by said scanning means for initiating operation of said rewind means in the absence of pulse signals from the scanning means.

3. Apparatus according to claim 1, in which said first drive means for withdrawing the leading end of the tape are connected to said logic circuit means, said logic circuit means including means responsive to the absence of pulses from said scanning means within a prescribed period of time after initiation of said drive means to energize said rewinding means.

4. Apparatus according to claim 2, in which the tape being transported is perforated parallel to a longitudinal edge thereof and in which said scaning means comprise a radiation source on one side of the tape path and directed to the perforations, and a radiation-sensitive device on the other side of the tape path for receiving pulses of radiation through the perforations of said tape.

5. Apparatus according to claim 4, in which said scanning means further comprise circuit means for deriving from said pulse output signals of the radiation-sensitive device, first and second control signals which vary with the output and which differ from one another by a substantially constant potential difference, said circuit means having an integrating circuit to which the first control signal is applied and which rectifies the peak voltage to produce a reference level, a differential amplifier having a first input to receive said second signal, and wherein the sense and magnitude of the potential difference being such that an output pulse is generated at the output of said differential amplifier by the peak voltage of the second signal, which exceeds the reference level and which is generated on each passage of a perforation past said light source.

6. Apparatus according to claim 5, in which said circuit means includes a transistor operated in the conductive direction and followed by a voltage divider to develop said substantially constant potential difference.

7. Apparatus according to claim 2, in which said first drive means comprise a driving element for the tape and a stripper finger both mounted on a slide which is movable towards the delivery spool to bring the driving element and the stripper finger into contact with the tape thereon.

8. Apparatus according to claim 7 in which the driving element comprises a belt extending around a deflector pulley and a driving pulley both of which are mounted on the slide and a motor for the driving pulley.

9. Apparatus acording to claim 8, in which the slide has second driving means comprising a force accumulator acting on said slide and urging it towards said delivery spool, a traction device secured at one end of said second driving means and is wound at the other to a driving shaft of said second driving means and which holds said slide in position whereby, when the driving motor is actuated, the belt rotates and said traction device is unwound to permit said slide to move towards said delivery spool under the action of the force accumulator.

10. Apparatus according to claim 9, in which said driving shaft of the motor carries a winding drum on which said traction device is wound and which incorporates a free wheeling mechanism permitting the winding drum to come to rest when the belt engages the tape.

11. Apparatus according to claim 7, in which the stripper finger is resiliently mounted on the slide.

12. Apparatus according to claim 2, in which said rewinding means comprise a friction roller engageable against flanges of said delivery spool, a lever on which the friction roller is mounted and which is pivotable about a pivot disposed between the shafts of said friction roller and said delivery spool, an intermediate roller on the pivot, an electric motor, and a belt drive driving said friction roller from the electric motor and passing around the intermediate roller.

13. Apparatus according to claim 12, in which a stop is provided to limit the pivoting movement said lever in one direction and to define a position of rest in which said friction roller is disengaged from said delivery spool.

14. Apparatus according to claim 12, in which said friction roller has two contact rings tapering in opposite directions and adapted to engage between said flanges of the delivery spool.

15. Apparatus according to claim 2, in which a suction device is connected to said storage spool to rotate therewith and to generate between the flanges of said storage spool a current of air directed towards the rotation axis.

16. Apparatus according to claim 15, in which said suction device consists of blades of the centrifugal-pump type, mounted on the outside of one of the flanges of the storage spool and enclosed at the top, and of sunction intake orifices in the said flange.

17. Apparatus according to claim 15, in which the motor for the storage spools delivers a torque which is low but which is almost independent of its speed of rotation.

18. Apparatus according to claim 2, in which the storage spool has a constant torque motor which is connected to a motor rotation speed scanner generating a pulse output dependent on the speed of rotation and connected with said logic circuit means which compares the pulse outputs of the motor speed scanner and the tape scanner and which is arranged to activate said rewinding means if a prescribed relation of the pulse trains has not been obtained within a given time after the withdrawal means have been actuated.

19. Apparatus according to claim 18, in which the rotation speed scanner comprises a light source directed towards alternating black and white markings on a rotor of constant torque motor and a light sensitive deivce arranged to receive light reflected from said white markings.

* * * * *